US010525695B2

(12) United States Patent
Lu et al.

(10) Patent No.: US 10,525,695 B2
(45) Date of Patent: Jan. 7, 2020

(54) THREE-DIMENSIONAL PRINTING METHOD

(71) Applicants: XYZprinting, Inc., New Taipei (TW); Kinpo Electronics, Inc., New Taipei (TW)

(72) Inventors: Ting-Yu Lu, New Taipei (TW); Peng-Yang Chen, New Taipei (TW)

(73) Assignees: XYZprinting, Inc., New Taipei (TW); Kinpo Electronics, Inc., New Taipei (TW)

(*) Notice: Subject to any disclaimer, the term of this patent is extended or adjusted under 35 U.S.C. 154(b) by 396 days.

(21) Appl. No.: 15/432,944

(22) Filed: Feb. 15, 2017

(65) Prior Publication Data
US 2018/0133984 A1    May 17, 2018

(30) Foreign Application Priority Data
Nov. 17, 2016 (CN) .......................... 2016 1 1010554

(51) Int. Cl.
*B33Y 50/02* (2015.01)
*B29C 64/10* (2017.01)
(Continued)

(52) U.S. Cl.
CPC ............ *B33Y 50/02* (2014.12); *B29C 64/135* (2017.08); *B29C 64/20* (2017.08); *B29C 64/386* (2017.08);
(Continued)

(58) Field of Classification Search
CPC ......... B33Y 50/02; B29C 64/10; B29C 64/35; B29C 64/20; B29C 64/241; B29C 64/171; B29C 64/124
See application file for complete search history.

(56) References Cited

U.S. PATENT DOCUMENTS

| 2006/0108712 A1* | 5/2006 | Mattes | .................... B22F 3/004 264/308 |
| 2014/0265034 A1* | 9/2014 | Dudley | .................. B33Y 10/00 264/401 |

(Continued)

FOREIGN PATENT DOCUMENTS

| CN | 203410032 | 1/2014 |
| CN | 205573044 | 9/2016 |

(Continued)

OTHER PUBLICATIONS

"Office Action of China Counterpart Application", dated Jun. 5, 2019, pp. 1-8.

*Primary Examiner* — Alison L Hindenlang
*Assistant Examiner* — Debjani Roy
(74) *Attorney, Agent, or Firm* — JCIPRNET

(57) ABSTRACT

A three-dimensional (3D) printing apparatus includes a tank containing a forming material in liquid, a platform dipped into or moved away the forming material, a curing device disposed besides the tank or the platform, and a control device electrically connected to at least one of the tank and the platform and the curing device. An inner bottom of the tank includes a forming area and a peeling area in a stepped shape, and the forming area is higher than the peeling area. A 3D printing method includes providing the 3D printing apparatus, then the liquid-state forming material between the platform and the forming area is cured to form a solidification layer. Afterwards, a position and an occupied proportion of the solidification layer corresponding to the inner bottom, and a movement range of a relative movement is determined according thereto so as to completely peel off the solidification layer.

10 Claims, 5 Drawing Sheets

(51) Int. Cl.
    *B29C 64/20*      (2017.01)
    *B29C 64/135*     (2017.01)
    *B29C 64/386*     (2017.01)
    *B33Y 10/00*      (2015.01)
    *B33Y 30/00*      (2015.01)
    B29K 105/00       (2006.01)

(52) U.S. Cl.
    CPC ............... *B33Y 10/00* (2014.12); *B33Y 30/00* (2014.12); *B29K 2105/0058* (2013.01)

(56) References Cited

U.S. PATENT DOCUMENTS

2014/0339741 A1* 11/2014 Aghababaie ............ B29C 64/20
                                                    264/401
2015/0165678 A1*  6/2015 Ding ...................... B33Y 30/00
                                                    425/150

FOREIGN PATENT DOCUMENTS

| CN | 205573045 | 9/2016 |
| CN | 107199700 | 9/2017 |
| EP | 3017802   | 5/2016 |

* cited by examiner

THREE-DIMENSIONAL PRINTING METHOD

CROSS-REFERENCE TO RELATED APPLICATION

This application claims the priority benefit of China application serial no. 201611010554.5, filed on Nov. 17, 2016. The entirety of the above-mentioned patent application is hereby incorporated by reference herein and made a part of this specification.

BACKGROUND

Field

The disclosure relates to a three-dimensional printing method.

Description of Related Art

As technology advanced in the recent years, many methods that utilize additive manufacturing technology (e.g., layer-by-layer model construction) to build three-dimensional (3D) physical models have been proposed. Generally speaking, the additive manufacturing technology involves converting design data of a 3D model, which is constructed by software, such as computer aided design (CAD), into multiple thin (quasi-two-dimensional) cross-sectional layers that are stacked in sequence.

Currently, many techniques for forming a plurality of thin cross-sectional layers have been developed. For example, a movement platform is disposed in a liquid-state forming material, and a light source is driven to irradiate on the liquid-state forming material along X-Y coordinates according to X-Y-Z coordinates constructed according to the design data of the 3D model, thereby curing the liquid-state forming material into correct shapes of the cross-sectional layers. Next, as the movement platform moves along a Z-axis, the liquid-state forming material forms a three-dimensional article in a state of layer-by-layer curing and stacking.

However, as mentioned above, the movement platform has to move along the Z-axis once whenever one solidification layer is completed, which takes excessive time in movement of the movement platform along the Z-axis direction and results in excessive manufacturing time and lack of efficiency.

SUMMARY

The disclosure provides a three-dimensional printing method capable of effectively peeling off a solidification layer and thereby enhancing a printing efficiency.

The three-dimensional printing method of the disclosure includes providing a three-dimensional printing apparatus, wherein the three-dimensional printing apparatus includes a tank, a platform, a curing device, and a control device. The tank is configured to contain a liquid-state forming material, wherein an inner bottom of the tank includes a forming area and a peeling area in a stepped shape, and the forming area is higher than the peeling area. The platform is configured to dip into or move away from the liquid-state forming material. The curing device is disposed beside the tank or the platform. The control device is electrically connected to at least one of the tank and the platform and to the curing device. Next, the liquid-state forming material between the platform and the forming area is cured to form a solidification layer. Afterwards, a position of the solidification layer corresponding to the inner bottom of the tank and an occupied proportion are determined, and a movement range of a relative movement is determined according to the position and the occupied proportion. The relative movement enables the solidification layer to be completely peeled off the forming area. Then, the tank or the platform is driven to perform the relative movement of the tank and the platform, such that the solidification layer is peeled off the forming area and moved to a position above the peeling area.

In light of the above, in the three-dimensional printing method provided above, the inner bottom of the tank of the three-dimensional printing apparatus is divided into the forming area and the peeling area in a stepped manner, wherein the higher forming area is the area where the solidification layer is formed. Afterwards, the relative movement takes place between the tank and the platform to peel the solidification layer off the forming area through a shear force, so that forming steps of a next solidification layer can be subsequently performed. Moreover, the position where the solidification layer (article) is formed on the platform is determined and the movement range required for the relative movement is determined according to the position, such that the solidification layer can be completely peeled off the forming area through the relative movement, and the manufacturing time can thereby be effective reduced.

To provide a further understanding of the aforementioned and other features and advantages of the disclosure, exemplary embodiments, together with the reference drawings, are described in detail below.

DESCRIPTION OF THE EMBODIMENTS

Figure 1:
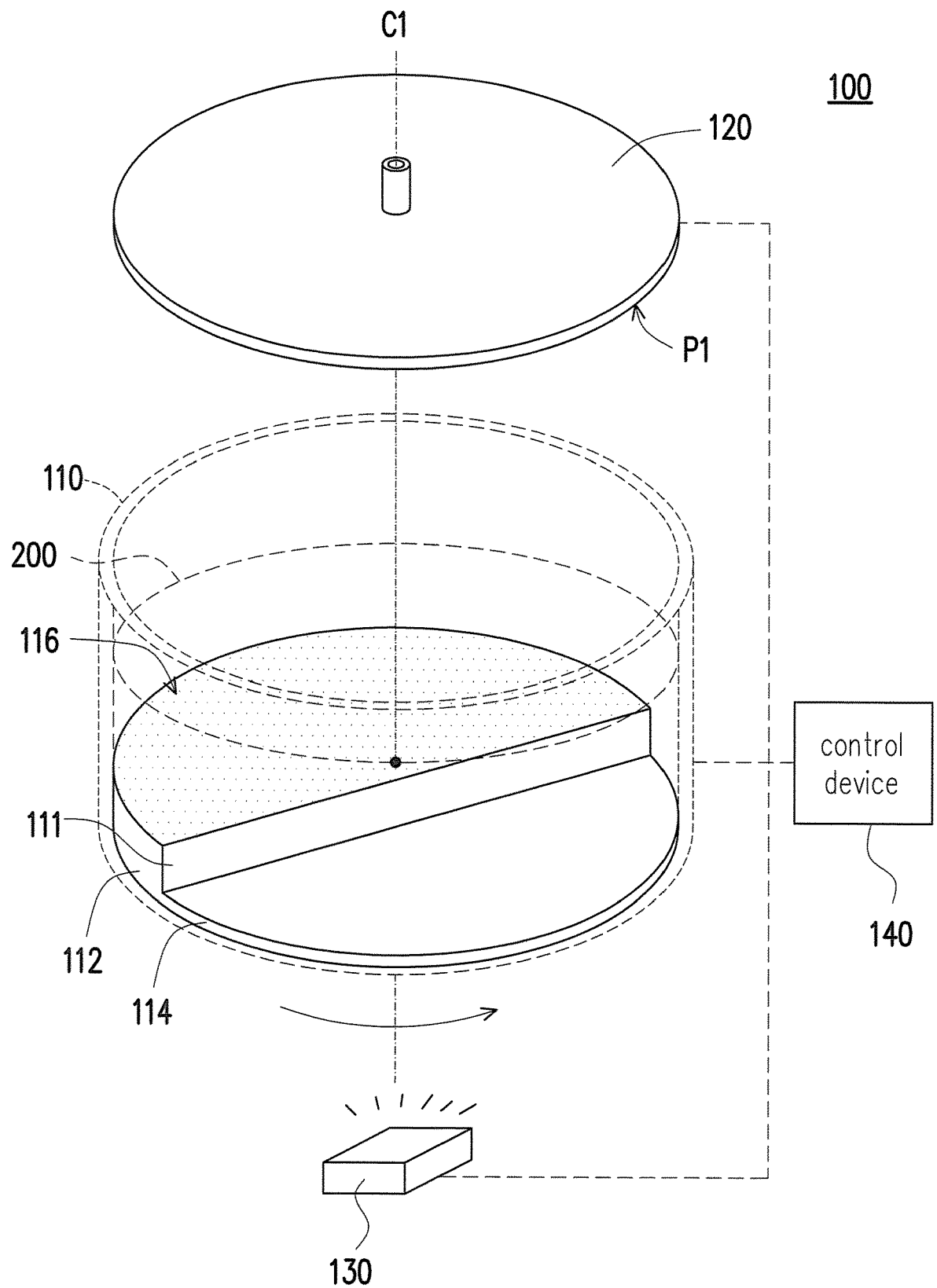
FIG. 1 is a schematic diagram illustrating a three-dimensional printing apparatus according to one embodiment of the disclosure.

The foregoing and other technical content, features, and effects of the disclosure will be clearly presented in the following detailed description of the embodiments with reference to the reference drawings. Directional terminology, such as "upper", "lower", "front", "back", "left", "right", "bottom", "top", etc., mentioned in the embodiments below is used with reference to the orientation of the drawings attached. Accordingly, the directional terminology used will be regarded as illustrating rather than limiting the disclosure. Moreover, in the embodiments below, the same or similar components will be marked with the same or similar reference numerals.

FIG. 1 is a schematic diagram illustrating a three-dimensional printing apparatus according to one embodiment of the disclosure. In the present embodiment, a three-dimensional printing apparatus 100 includes a tank 110, a platform 120, a curing device 130, and a control device 140. The tank 110 is configured to contain a liquid-state forming material 200. The platform 120 is disposed relatively to the tank 110 and is configured to dip into or move away from the liquid-state forming material 200. The curing device 130 is disposed beside the tank 110 or beside the platform 120 for curing the liquid-state forming material 200 between the platform 120 and the tank 110 to form at least one solidification layer (not illustrated) on the platform 120. Through layer-by-layer curing and stacking, the solidification layer is finally formed into a three-dimensional object. The control device 140 is electrically connected to at least one of the platform 120 and the tank 110 and is also connected to the curing device 130 to drive the components to move relatively to each other.

Here, the three-dimensional printing apparatus 100 is, for example, a stereo lithography (SL) apparatus or a digital light processing (DLP) apparatus. The liquid-state forming material 200 is, for example, a photosensitive resin. Accordingly, the control device 140 drives the curing device 130 (e.g., a curing light source) to irradiate light such that the liquid-state forming material 200 is cured and formed on the platform 120. However, the disclosure is not limited hereto. Any materials and corresponding stacked layer manufacturing means that can achieve the foregoing step of forming the three-dimensional article are all applicable here.

In light of the above, in the present embodiment, through the curing device 130, the liquid-state forming material 200 is cured and stacked layer by layer on a forming plane P1 of the platform 120. Meanwhile, with a relative movement (e.g., rotation and moving away) of the tank 110 and platform 120, the three-dimensional object is finally formed.

In addition, the disclosure does not limit a number of the curing device 130 and its position relative to the tank 110. Although the present embodiment illustrates the curing device 130 as below the tank 110, it may substantially be correspondingly disposed according to the conditions required for formation. In other words, on the condition that the curing device 130 can effectively cure and form the liquid-state forming material 200 on the platform 120 to gradually form the three-dimensional object with a bottom-up elevation movement of the platform 120, the curing device 130 may be at any adequate position beside the tank 110 or beside the platform 120.

In the present embodiment, an inner bottom of the tank 110 includes a forming area 112 and peeling area 114 in a stepped manner, wherein the forming area 112 is higher than the peeling area 114, and a coating layer 116 such as polytetrafluoroethene (PTFE) or polydimethylsiloxane (PDMS) is disposed on a surface of the forming area 112. The control device 140 drives the tank 110 to rotate relatively to the platform 120 about a central axis C1, and the control device 140 further controls the platform 120 to move relatively to the tank 110 along the central axis C1 to move the platform 120 close to the tank 110 or away from the tank 110. When the foregoing relative rotation is performed, an area on the platform 120 switchably corresponds to the forming area 112 or the peeling area 114 of the tank 110. Here, "correspond" means that a specific area on the platform 120 may move to a position right above the forming area 112 or right above the peeling area 114 of the tank 110 at different times, wherein a relative distance between the platform 120 and the forming area 112 can be adjusted as required by the control device 140.

Specifically, the inner bottom of the tank 110 has a circular contour and is controlled to rotate about the central axis C1. Rotation angles of the forming area 112 and the peeling area 114 with respect to the inner bottom of the tank 110 occupied by the circular contour are respectively 180 degrees. In other words, a same area of the platform 120 can switch between states of corresponding to the forming area 112 and corresponding to the peeling area 114 as the tank 110 is rotated by 180 degrees once. Moreover, an area of the forming area 112 is substantially greater than an area of the peeling area 114. In other words, the central axis C1 on which the tank 110 is rotated is substantially located in a range of the forming area 112. As illustrated in FIG. 1, due to such configuration, the light of the control device 140 irradiated to the forming area 112 from below the tank 110 is free from negative effect of light scattering resulting from a stage difference structure 111 in a stepped shape.

Figure 2:
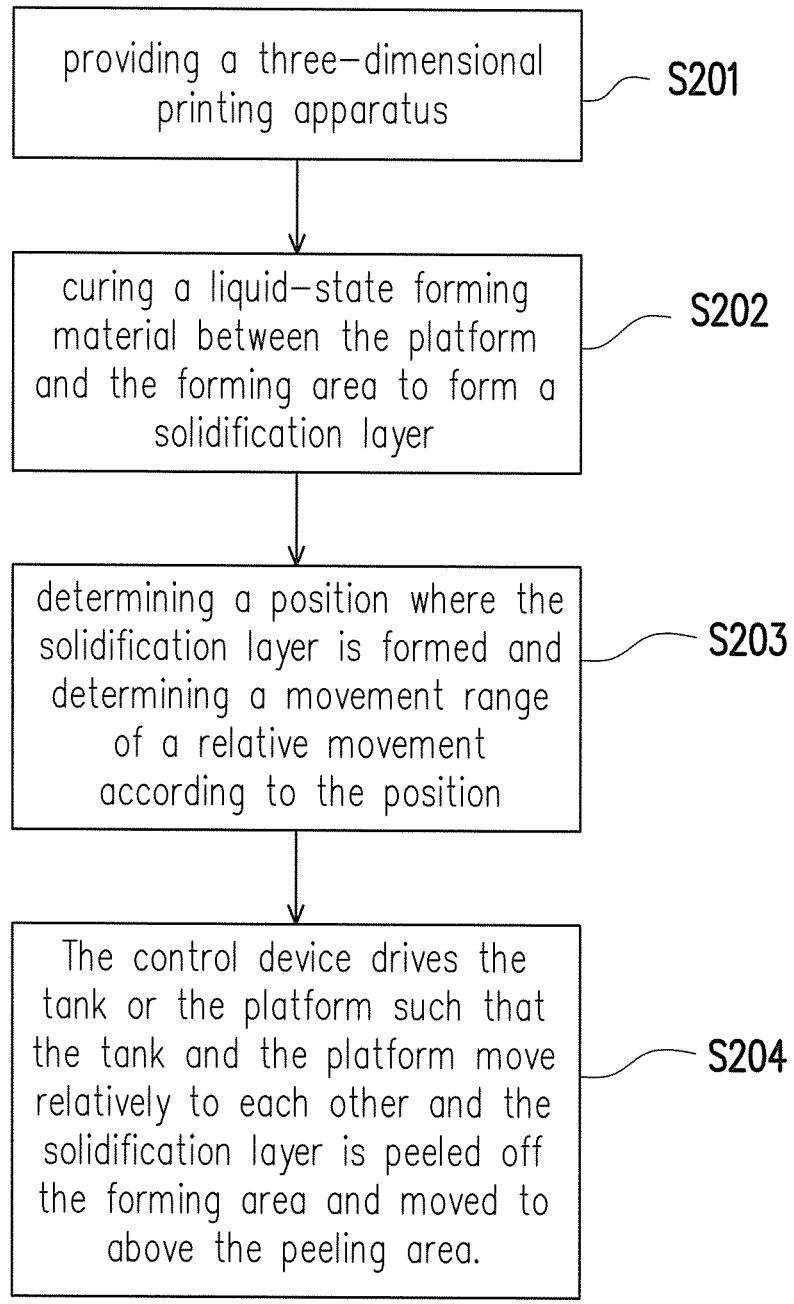
FIG. 2 is a flowchart illustrating a three-dimensional printing method according to one embodiment of the disclosure.
Figure 3A:
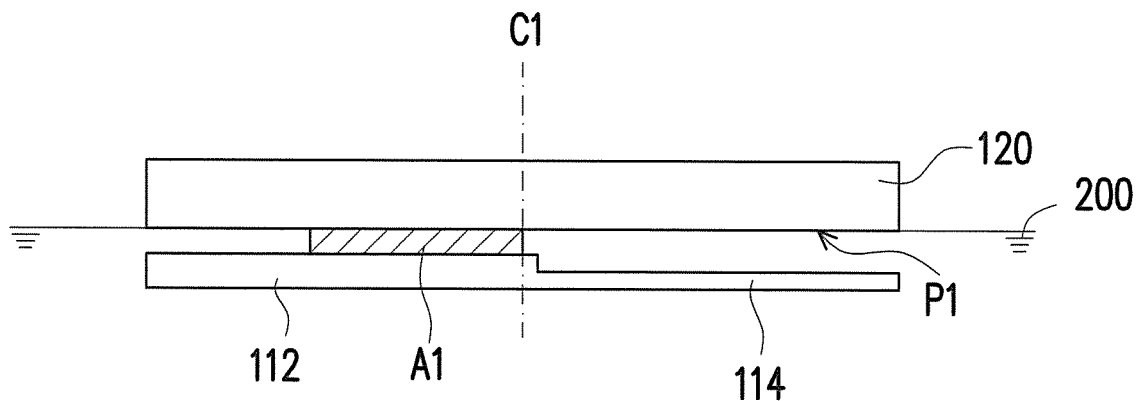
FIG. 3A and FIG. 3B are partial side views respectively illustrating the three-dimensional printing apparatus of FIG. 1 in different states.
Figure 3B:
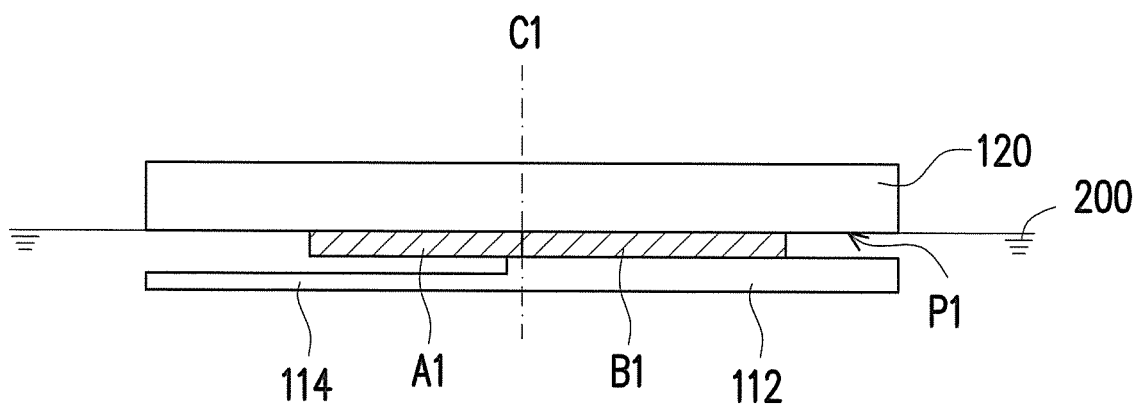

According to a three-dimensional printing method provided in the disclosure, FIG. 2 is a flowchart illustrating a three-dimensional printing method according to one embodiment of the disclosure that is applicable to the three-dimensional printing apparatus disclosed above for printing a three-dimensional object on a platform. FIG. 3A and FIG. 3B are partial side views respectively illustrating the three-dimensional printing apparatus of FIG. 1 in different states.

Referring to FIG. 1, FIG. 2, FIG. 3A, and FIG. 3B at the same time, first, in step S201, the three-dimensional printing apparatus 100 is provided. Please refer to the foregoing embodiments for relevant descriptions of the three-dimensional printing apparatus 100, which shall not be repeatedly described here.

Next, in step S202, the liquid-state forming material 200 between the platform 120 and the forming area 112 is cured to form a solidification layer A1 (as illustrated in FIG. 3A). Accordingly, after being irradiated by a curing light source provided by the curing device 130, the liquid-state forming material 200 is cured and formed on the platform 120 and is formed into the solidification layer A1. Specifically, only areas irradiated by the curing light source are cured. Moreover, instead of overall irradiation, the areas irradiated by the curing light source are determined by a cross-sectional layer design of a shape of the three-dimensional object to be formed. Accordingly, in step S202, a position where a curing reaction takes place is limited to an area between the platform 120 and the forming area 112 that includes the liquid-state forming material 200.

Afterwards, step S203 is firstly performed to determine a position where the solidification layer is formed and determine a movement range of a relative movement according to the position. Then, in step S204, the control device 140 drives the tank 110 or the platform 120 such that the tank 110 and the platform 120 move relatively to each other and the solidification layer A1 is peeled off the forming area 112 and moved to a position above the peeling area 114. Specifically, the three-dimensional object to be printed may come in the following forms: a fully-distributed object, an object only distributed on a left half or a right half of the platform, and an object distributed on both the left and right halves of the platform. Different printing forms of objects affect a mode of the relative movement between the tank and the platform in step S204.

Here, the relative movement refers to, for example, rotation, translation, moving close, moving away, or a combination thereof. For example, the control device 140 drives the tank 110 to rotate relatively to the platform 120 such that the solidification layer A1 formed in step S202 is rotated with the platform 120 and is peeled off the forming area 112 and moved to a position corresponding to the peeling area 114. Moreover, due to the step-shaped structure of the inner bottom of the tank 110, the solidification layer A1 is substantially suspended above the peeling area 114 (as illustrated in FIG. 3B). In addition, the coating layer 116 disposed on the surface of the forming area 112 contributes to reducing a viscous force and a friction between the solidification layer A1 and the forming area 112 such that the solidification layer A1 is smoothly peeled off the forming area 112. Accordingly, with the relative rotation movement, the solidification layer A1 is peeled off the inner bottom of the tank 110 through a shear force, thus avoiding the need to apply force along the central axis C1 (normal to the forming area 112), which wastes more manufacturing time. Next, the liquid-state forming material 200 between the forming area 112 and the platform 120 is cured to form a solidification layer B1, and the solidification layer B1 is peeled off the forming area 112 through performing the foregoing step S204 again. Repeating the curing and peeling steps in this way, the liquid-state forming material is formed into the three-dimensional object in a state of layer-by-layer curing and stacking.

It shall be stated that, as long as the relative movement is generated between the tank 110 and the platform 120, the solidification layer A1 can be peeled off the forming area 112 and moved to the position above the peeling area 114. In the present embodiment, the control device 140 is used to drive the tank 110 to rotate relatively to the platform 120. In another embodiment, the platform 120 remains stationary while the inner bottom of the tank 110 in a circular contour is controlled to rotate about a central axis C1, thereby generating the relative movement between the tank 110 and the platform 120. In another embodiment, the tank 110 and the platform 120 may also move relatively to each other by rotating while moving away. However, the disclosure is not limited hereto, and the manner of the relative movement may be selected according to the needs to save the manufacturing time.

In step S203, where the three-dimensional object to be printed is a fully-distributed object (namely, an area occupied by the object on the platform 120 corresponds to an area on the inner bottom of the tank 110 that stretches over the forming area 112 and peeling area 114), after the solidification layer of step S202 is formed, the tank 110 is rotated by 180 degrees (as illustrated in FIG. 3B) in step S203. Through a shear force created by the relative movement, the solidification layer A1 is peeled off the forming area 112, and at this time, the forming area 112 corresponds to another area to be printed of the platform 120 to form the solidification layer B1. Specifically, since the inner bottom of the tank 110 includes both the forming area 112 and the peeling area 114, the corresponding positions of the platform 120 and the forming area 112 have to be switched to achieve the purpose of printing a fully-distributed object. Accordingly, after the solidification layer A1 is formed, the solidification layer A1 is first peeled off through the relative rotation movement in step S203. At this time, the forming area 112 of the tank 110 corresponds to the another area to be printed of the platform 120, and the liquid-state forming material 200 between the platform 120 and the forming area 112 is then cured to form the solidification layer B1. Next, the platform 120 is driven to rise along the central axis C1 to continue with the foregoing steps of layer-by-layer curing and stacking to complete the object to be printed. In this process, the relative movement between the tank 110 and the platform 120 includes relative rotation by 180 degrees first, and then moving away relatively to each other. However, the disclosure is not limited hereto. In another embodiment, the relative rotation and moving away between the tank 110 and the platform 120 may take place simultaneously, and a path of the relative movement between the tank 110 and the platform 120 is thus in a spiral shape. For example, if a height of each elevation of the platform 120 is a fixed value (e.g., 0.1 mm, which is, for example, a thickness of a single layer of the solidification layer), while the tank 110 is driven to rotate, the platform 120 is driven to rise, and the 0.1 mm to be elevated of the platform 120 is distributed in 180 degrees. In other words, at this time, the tank 110 is rotated while moving away relatively to the platform 120, and after the tank 110 is rotated by 180 degrees, the platform 120 has simultaneously been elevated by 0.1 mm. Of course, a slope of path of the spiral-shaped path is not limited here. In another unillustrated embodiment, the platform 120 may be elevated by the foregoing height each time when the tank 110 is rotated by 10 degrees, depending on the configuration of the solidification layer on the platform, material characteristics of the solidification layer, and the desired printing precision of the three-dimensional object.

Figure 4:
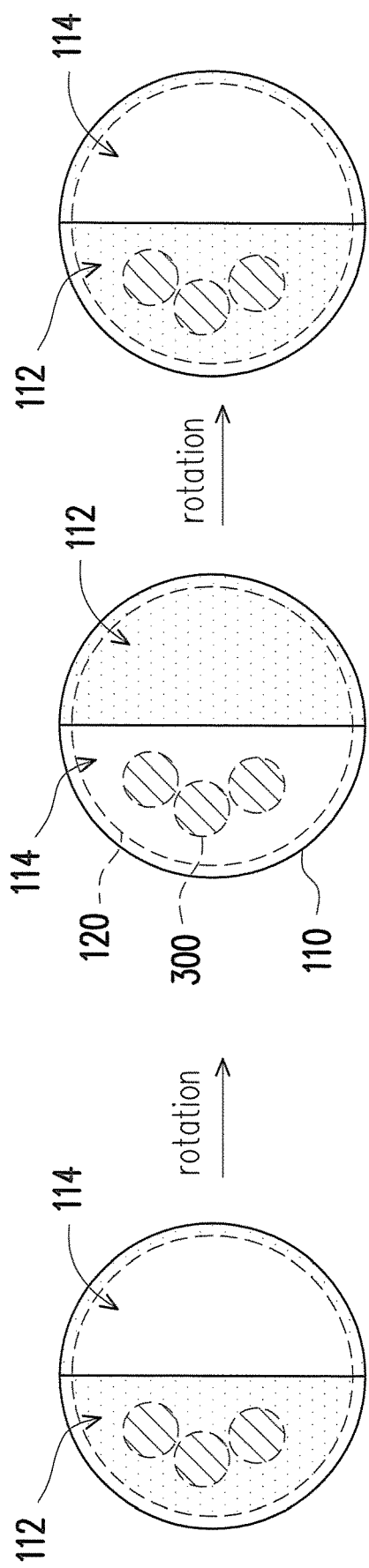
FIG. 4 is a partial bottom view illustrating the three-dimensional printing apparatus of FIG. 1 in a different state according to another embodiment.

FIG. 4 is a partial bottom view illustrating the three-dimensional printing apparatus of FIG. 1 in a different state according to another embodiment. Referring to FIG. 4, in step S203, where the three-dimensional object to be printed is an object only distributed on the left half or the right half of the platform (for example, an object 300 (rendered in broken lines) is only distributed on the left half of the platform 120 (rendered in broken lines) here), after the solidification layer of step S202 is formed, the tank 110 is first rotated by 180 degrees to peel the solidification layer off the forming area 112 through the shear force generated by the relative movement. Next, after the platform 120 is elevated along the central axis C1, the tank 110 is rotated by 180 degrees again. At this time, the forming area 112 corresponds to the left half of the platform 120 again and continues with the steps of layer-by-layer curing and stacking, and a formed next solidification layer is stacked on the previous solidification layer to form the object 300. In this process, the relative movement between the tank 110 and the platform 120 includes relative rotation first, and then moving away relatively to each other. However, the disclosure is not limited hereto. In another embodiment, the relative rotation and moving away between the tank 110 and the platform 120 may take place simultaneously, and a path of the relative movement between the tank 110 and the platform 120 is thus in a spiral shape. Relevant descriptions of the relative movement (rotation and moving away) that takes place here between the tank 110 and platform 120 are similar to the foregoing embodiments and are thus not repeatedly described here.

Figure 5:
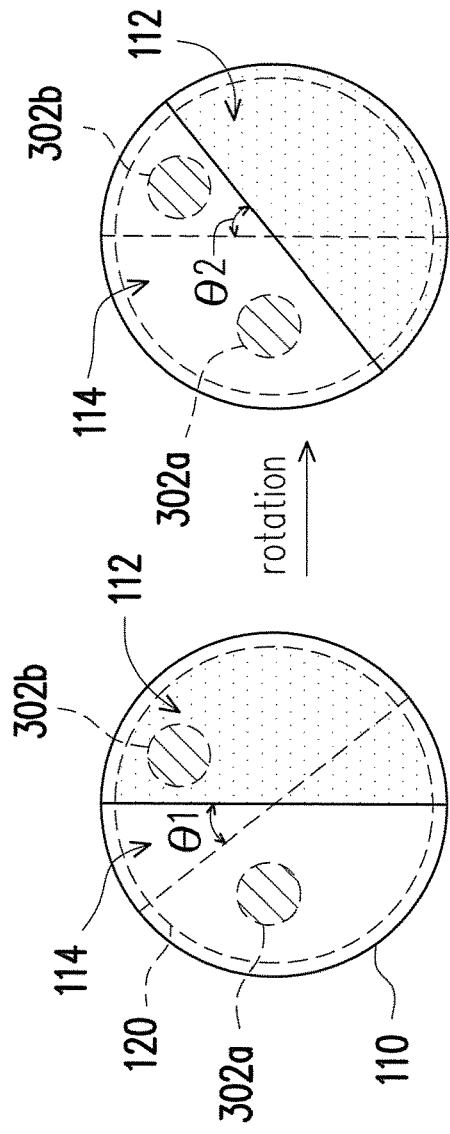
FIG. 5 is a partial bottom view illustrating the three-dimensional printing apparatus of FIG. 1 in a different state according to another embodiment.

FIG. 5 is a partial bottom view illustrating the three-dimensional printing apparatus of FIG. 1 in a different state according to another embodiment. Referring to FIG. 5, in step S203, where the three-dimensional article to be printed is an object distributed on both the left and right halves of the platform, after the solidification layer of step S202 is formed (e.g., formed into an object 302a), the tank 110 is rotated by a specific angle $\theta 1$ first, wherein the angle $\theta 1$ is greater than or equal to an angle at the circumference of the object 302a with respect to the inner bottom of the tank 110 to exactly enable the object 302a on the platform 120 to be peeled off the forming area 112. Next, after the platform 120 is elevated along the central axis C1, at this time, the forming area 112 corresponds to another area to be printed on the platform 120 and printing of the object 302b continues. Afterwards, the tank 110 is rotated again to a specific angle θ2 to peel the object 302b off the forming area 112. In this process, the relative movement that takes place between the tank 110 and the platform 120 includes relative rotation first, and then moving away relatively to each other. However, the disclosure is not limited hereto. In another embodiment, the relative rotation and moving away between the tank 110 and the platform 120 may take place simultaneously, and a path of the relative movement between the tank 110 and the platform 120 is thus in a spiral shape. Relevant descriptions of the relative movement (rotation and moving away) that takes place here between the tank 110 and platform 120 are similar to the foregoing embodiments and are thus not repeatedly described here.

Accordingly, the position where the solidification layer (article) is formed is first determined in step S203, and the movement range required for the relative movement is then determined according to the position of the article to exactly enable the solidification layer to be completely peeled off the forming area through the relative movement (e.g., rotation, moving away, or a combination thereof). Taking the relative rotation movement as an example, as long as the article can be peeled off the forming area through rotation by a specific angle (e.g., rotation by 45 degrees), it is not necessary to excessively rotate (e.g., by 180 degrees), and a time spent in the manufacturing process can be saved. In another embodiment, the determination step in step S203 may also be completed in a model construction stage before printing begins. However, the disclosure is not limited hereto.

Figure 6:
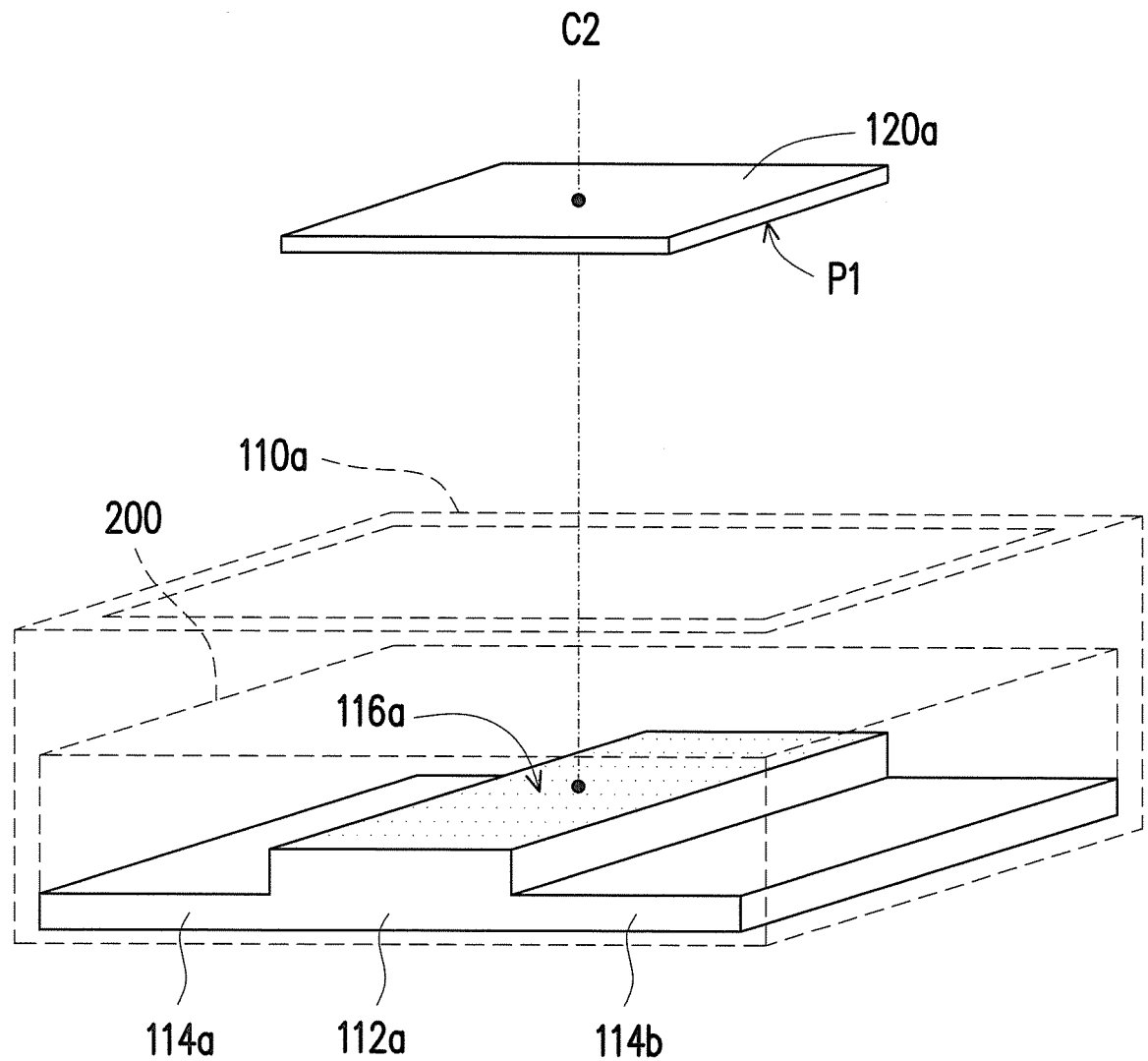
FIG. 6 is a partial schematic diagram illustrating a three-dimensional printing apparatus according to another embodiment.

FIG. 6 is a partial schematic diagram illustrating a three-dimensional printing apparatus according to another embodiment. Since FIG. 6 merely schematically illustrates the tank and the platform of the three-dimensional printing apparatus, reference may be made to the three-dimensional printing apparatus 100 of FIG. 1 for other components of the three-dimensional printing apparatus and relevant descriptions thereof. Components identical to those in FIG. 1 are marked with the same numerals, and the same characteristics of the same components are not repeatedly described here. As illustrated in FIG. 6, the three-dimensional printing apparatus 100 includes a tank 110a and a corresponding platform 120a. An inner bottom of the tank 110a is in a stepped shape and includes a forming area 112a, a peeling area 114a, and a peeling area 114b, wherein the forming area 112a is located between the peeling area 114a and the peeling area 114b, and the forming area 112a is higher than the peeling area 114a and the peeling area 114b. Therefore, if a cross section is taken along a longer side of the tank 110a, a cross section of the inner bottom of the tank 110a will rise in the middle. Moreover, a coating layer 116a such as polytetrafluoroethene (PTFE) or polydimethylsiloxane (PDMS) is disposed on a surface of the forming area 112a. The control device 140 drives the tank 110a to translate relatively to the platform 120a, and the control device 140 further controls the platform 120a to move relatively to the tank 110a along a central axis C2 to move the platform 120a close to the tank 110a or away from the tank 110a. During the relative translation, an area on the platform 120a switchably corresponds to the forming area 112a or the peeling area 114a and the peeling area 114b of the tank 110a. Here, "correspond" means that a specific area on the platform 120a may move to right above the forming area 112a or right above the peeling area 114a and the peeling area 114b of the tank 110a at different times, wherein a relative distance between the platform 120a and the forming area 112a can be adjusted as required by the control device 140.

Specifically, compared to FIG. 1, the embodiment disclosed in FIG. 6 differs in the shape of the tank and the configuration of the inner bottom thereof. Therefore, when step S204 is performed, the manner of the relative movement taking place between the tank 110a and the platform 120a is also different. For example, the control device 140 drives the tank 110a to translate relatively to the platform 120a, such that the solidification layer formed in step S202 is translated with the platform 120a and is peeled off the forming area 112a and moved to a position corresponding to the peeling area 114a or the peeling area 114b. Due to the step-shaped structure of the inner bottom of the tank 110a, the solidification layer is substantially suspended above the peeling area 114a or the peeling area 114b. Moreover, similar to the foregoing embodiment of FIG. 1, the tank 110a and the platform 120a may move relatively to each other by translating while moving away so as to reduce the manufacturing time.

In summary of the above, the three-dimensional printing method provided in the disclosure is applicable to the three-dimensional printing apparatus disclosed above. The inner bottom of the tank is divided into the forming area and the peeling area in a stepped shape, wherein the higher forming area is the area where the solidification layer is formed. Afterwards, the relative movement takes place between the tank and the platform to peel the solidification layer off the forming area through a shear force, so that forming steps of a next solidification layer can be subsequently performed. Moreover, the position where the solidification layer (article) is formed on the platform is determined and the movement range required for the relative movement is determined according to the position, such that the solidification layer can be completely peeled off the forming area through the relative movement, and the manufacturing time can thereby be effectively reduced.

Lastly, it should be noted that the embodiments above are merely meant to describe the technical solutions of the disclosure rather than limit the disclosure. Although the embodiments above have described the disclosure in detail, any person skilled in the art shall understand that he or she may still make modifications to the technical solutions recited in the embodiments above or make equivalent replacements of part or all of the technical features therein. The modifications and replacements do not cause the nature of the corresponding technical solutions to depart from the scope of the technical solutions of the embodiments of the disclosure.

What is claimed is:

1. A three-dimensional printing method comprising: providing a three-dimensional printing apparatus, the three-dimensional printing apparatus comprising: a tank for containing a liquid-state forming material, wherein an inner bottom of the tank comprises a forming area and a peeling area, the forming area and the peeling area are in a stepped shape, and the forming area is higher than the peeling area; a platform for dipping into or moving away from the liquid-state forming material; a curing device disposed beside the tank or the platform; and a control device electrically connected to at least one of the tank and the platform and electrically connected to the curing device; curing the liquid-state forming material between the platform and the forming area to form a solidification layer; determining a position of the solidification layer corresponding to the inner bottom of the tank and an occupied proportion, and determining a movement range of a relative movement according to the position and the occupied proportion, the relative movement enabling the solidification layer to be completely peeled off the forming area; and driving the tank or the platform to perform the relative movement between the tank and the platform, such that the solidification layer is peeled off the forming area and moved to a position above the peeling area, wherein the inner bottom of the tank is controlled to rotate about a central axis, and the central axis is located within the forming area and an area of the forming area is greater than or equal to an area of the peeling area.

2. The three-dimensional printing method according to claim 1, wherein the relative movement comprises rotation, translation, moving close, moving away, or a combination thereof.

3. The three-dimensional printing method according to claim 1, wherein the inner bottom of the tank comprises a circular contour, wherein rotation angles occupied by the forming area and the peeling area with respect to the circular contour are respectively 180 degrees.

4. The three-dimensional printing method according to claim 3, wherein the tank is rotated and moved away relatively to the platform.

5. The three-dimensional printing method according to claim 3, wherein an area occupied by the solidification layer on the platform corresponds to an area on the inner bottom of the tank that stretches over the forming area and the peeling area, and the solidification layer comprises a first solidification layer and a second solidification layer, a method for forming the solidification layer comprising:

curing the liquid-state forming material between the platform and the forming area to form the first solidification layer;

driving the tank to rotate by 180 degrees relatively to the platform such that the first solidification layer is peeled off the forming area and moved to the position above the peeling area; and curing the liquid-state forming material between the platform and the forming area to form the second solidification layer.

6. The three-dimensional printing method according to claim 3, wherein the solidification layer comprises a first solidification layer and a second solidification layer, wherein an area occupied by the first solidification layer and the second solidification layer on the platform corresponds to an area on the inner bottom of the tank that only corresponds to the forming area or the peeling area, a method for forming the solidification layer comprising:

curing the liquid-state forming material between the platform and the forming area to form the first solidification layer;

driving the tank to rotate by 180 degrees relatively to the platform such that the first solidification layer is peeled off the forming area and moved to the position above the peeling area;

driving the tank to rotate by 180 degrees relatively to the platform, the tank being rotated and moved away relatively to the platform simultaneously or in sequence; and curing the liquid-state forming material between the platform and the forming area to form the second solidification layer, the second solidification layer being stacked on the first solidification layer.

7. The three-dimensional printing method according to claim 3, wherein the solidification layer comprises a first solidification layer and a second solidification layer, wherein areas occupied by the first solidification layer and the second solidification layer on the platform correspond to areas on the inner bottom of the tank that respectively correspond to the forming area or the peeling area, and a rotation angle of the area occupied by the first solidification layer on the platform corresponding to the inner bottom of the tank is smaller than 180 degrees, a method for forming the solidification layer comprising:

curing the liquid-state forming material between the platform and the forming area to form the first solidification layer;

driving the tank to rotate relatively to the platform, wherein a rotation angle is greater than or equal to an angle at the circumference of the first solidification layer with respect to the inner bottom of the tank such that the first solidification layer is peeled off the forming area and moved to the position above the peeling area; and curing the liquid-state forming material between the platform and the forming area to form the second solidification layer.

8. The three-dimensional printing method according to claim 1, wherein a number of the peeling area is at least two, and the forming area is located between the peeling area.

9. The three-dimensional printing method according to claim 8, wherein the tank is translated relatively to the platform.

10. The three-dimensional printing method according to claim 1, wherein the three-dimensional printing apparatus is a stereo lithography apparatus or a digital light processing apparatus.

* * * * *